United States Patent [19]

Dosaj et al.

[11] Patent Number: 4,680,096
[45] Date of Patent: Jul. 14, 1987

[54] PLASMA SMELTING PROCESS FOR SILICON

[75] Inventors: Vishu D. Dosaj, Midland; Alvin W. Rauchholz, Thomas Township, Saginaw County, Mich.

[73] Assignee: Dow Corning Corporation, Midland, Mich.

[21] Appl. No.: 813,330

[22] Filed: Dec. 26, 1985

[51] Int. Cl.$^4$ .............................................. C01B 33/02
[52] U.S. Cl. ..................................... 204/164; 423/350
[58] Field of Search ......................... 204/164; 423/350

[56] References Cited

U.S. PATENT DOCUMENTS 4,377,564  3/1983  Dahlberg ............................ 204/164
4,439,410  3/1984  Santén et al. ....................... 204/164

FOREIGN PATENT DOCUMENTS 2924584  1/1981  Fed. Rep. of Germany ...... 204/164

OTHER PUBLICATIONS

Muller et al., Scand. J. Metall., 1(1972), pp. 145–155.
Johannson and Eriksson, J. Electrochem. Soc.; Solid State Science and Technology, 131:2 (1984), pp. 365–370.
Coldwell and Roques, J. Electrochemical Soc., 124(11) (1977), pp. 1686–1689.
National Institute for Metallurgy Report No. 1895, "A Review of Plasma Technology with Particular Ref. to Ferro-Alloy Production", 4/14/77, p. 3.

*Primary Examiner*—John F. Niebling
*Attorney, Agent, or Firm*—Robert L. McKellar

[57] ABSTRACT

What is disclosed is a process for preparing silicon using a gas plasma as a heat source. The process comprises (a) generating a gas plasma in a reactor utilizing a transferred arc plasma configuration in which a minimum of gas is utilized to form a plasma; (b) feeding silicon dioxide and a solid reducing agent directly into the reactor and to the plasma; (c) passing the plasma gas, the silicon dioxide, and the solid reducing agent into a reaction zone of the reactor; (d) recovering molten silicon and the gaseous by-products.

36 Claims, 2 Drawing Figures

PLASMA SMELTING PROCESS FOR SILICON

BACKGROUND OF THE INVENTION

This invention relates to a process for smelting of silicon using a plasma as a heat source and is particularly directed to the preparation of silicon at purities adequate for metallurgical use and for use in solar cells.

At present, silicon is typically produced in a submerged electric arc furnace via the carbothermic reduction of silicon dioxide ($SiO_2$) with a solid carbonaceous reducing agent. The silicon dioxide may be in the form of quartz, fused or fume silica, or the like. The carbonaceous material may be in the form of coke, coal, wood chips, and other forms of carbon containing materials. The overall reduction reaction being $$SiO_2 + 2C = Si + 2CO.$$

It is generally recognized that the above reaction in reality involves multiple reactions, the most significant being outlined below:

$$SiO_2 + 3C = SiC + 2CO \quad (1),$$

$$SiO_2 + C = SiO + CO \quad (2),$$

$$SiO + 2C = SiC + CO \quad (3),$$

$$2SiO_2 + SiC = 3SiO + CO \quad (4),$$

and $$SiO + SiC = 2Si + CO \quad (5),$$

Silicon monoxide (SiO) is a gaseous species at the temperature of reaction and can be lost as a vapor if not completely reacted. Muller et al., Scand. J. Metall., 1 (1972), pp. 145–155, describe and define the theoretical equilibrium conditions for the Si—O—C chemical system of the carbothermic reduction of silicon dioxide to form silicon. A critical teaching of Muller et al. is the limitation that under equilibrium conditions the partial pressure of silicon monoxide must be equal to or greater than 0.67 atmospheres at atmospheric pressure and at a temperature of 1819° C. for reaction (5), above, to occur to form silicon. Johannson and Eriksson, J. Electrochem. Soc.:SOLID STATE SCIENCE AND TECHNOLOGY, 131:2 (1984), pp. 365–370, further expand upon the description and definition of the Si—O—C system. The teachings of Johannson and Eriksson define the influence of pressure upon the reaction. It is shown, theoretically, that 5 atmospheres is an optimum pressure for maximizing raw material efficiency to essentially a 100% silicon yield.

The use of a submerged electric arc furnace for the production of silicon has been used on a commercial basis for many years. It is generally recognized that there are several inherent disadvantages in use of such a system. In the present use of the submerged electric arc furnace, the silicon dioxide and carbonaceous reaction solids are charged to the top of the furnace. As the reaction progresses, a cavity forms at the bottom of the furnace at the lower end of the submerged electrode. Molten silicon collects at the bottom of the cavity. At the top of the cavity is a crust of reactants, intermediates, and product silicon. Above this crust are varying forms of solid reactants and intermediates.

Poor heat and mass transfer in a submerged electric arc furnace appear to cause poor utilization of the electrical energy applied and lowered raw material utilization. Present commercial units consume approximately 3 times the theoretical amount of energy required for these above reactions. This high level of energy consumption reflects the loss of energy introduced with the carbonaceous reductants as carbon monoxide lost in the by-product off-gases. Several factors contribute to the poor heat and mass transfer. The solid-solid and solid-gas mass transfer interactions between reactants and intermediates in the furnace limit effective heat and mass transfer in a conventional arc furnace. A further disadvantage is the loss of material in the form of volatile SiO with the gaseous by-products of the reaction. It is estimated that in present submerged arc furnaces, as much as 10 to 20 weight percent of the ultimate silicon yield is lost as SiO. Silicon monoxide reoxidizes to form $SiO_2$. As a consequence the SiO poses problems not only of material loss but plugging problems throughout the process. Further, $SiO_2$ that escapes from the system poses an environmental problem as an airborne particulate that must be collected and discarded, with considerable difficulty.

The present submerged electric arc furnace route to silicon is also hampered by mechanical problems. The flow of solids moving downward, counter-current to the flow of gases moving upward inhibits the flow of solids to the reaction cavity. Additionally solids are held up by bridging which is caused by the formation of the crust above the reaction cavity and the proximity of solids to the vertical electrodes. Bridging is also caused by the formation of sticky intermediates in the cooler upper portion of the furnace. This hold-up of solids necessitates the inclusion of openings in the furnace top and frequent opening of the reactor and rodding or "stoking" of the solids to facilitate a downward movement.

The carbon electrodes of the arc furnace are consumed and contribute both to the impurities in the final product silicon and the final cost of manufacture. The carbon electrodes are the major source of impurities in preparation of silicon in a conventional arc furnace. Further, it is estimated that as much as 10% of the cost of silicon manufacturing is attributable to replacement of and problems associated with the electrodes.

The use of a plasma in place of an electric arc furnace has several advantages. According to the reaction scheme, described supra, reaction (1)

$$SiO_2 + 3C = SiC + 2CO$$

is endothermic and consumes as much as 50% of the energy for the overall reduction reaction. Feeding of $SiO_2$ and carbon-containing material directly into the high-energy plasma maximizes heat and mass transfer to facilitate this reaction to form SiC. The efficient formation of SiC would further facilitate the subsequent reaction chain to form silicon, represented by the reactions (4) and (5), supra, $$2SiO_2 + SiC = 3SiO + CO,$$

and $$SiC + SiO = 2Si + CO.$$

The simultaneous melting of SiO₂ and formation of SiC would improve mass transfer. Configurational changes in the reactor could also eliminate the bridging of solids and the need to periodically open the furnace for "stoking." As a consequence, the furnace could be closed and operated under pressure. Closing of the furnace would facilitate recovery and reclamation of the energy content of the by-product gases, presently lost as noted, supra. The elimination of the carbon electrodes used in an arc furnace would result in subsequent increased purity of the final silicon product.

The use of a plasma to treat metal oxides is taught by Foex in U.S. Pat. No. 3,257,196, issued June 21, 1966. The method taught by Foex is the compressing of the material to be treated in a vessel which is capable of being rotated on its center axis. An axial cavity is provided into which the plasma can penetrate. The plasma may be used as a vehicle to carry reactants to the zone of solid reactants. The teachings of Foex are built around the need for a rotatable reactor which is obviously in a complicated batch configuration as compared to the continuous scheme for the instant invention. Additionally, the teachings of Foex are directed to eliminating the need for maintaining a powdered metal oxide feed in the plasma jet by compressing said powder into said rotating reactor and utilizing the centrifugal force to retain the powder in the reactor. The reaction zone in the Foex teaching would be at the surface of a dense, compacted solid rather than through a porous bed of solids as disclosed in the instant invention. The instant invention teaches the continuous feed of powdered reactants into the plasma zone. These differences would have a significant impact upon improved efficiency of mass and heat transfer for the instant invention.

Coldwell and Roques, J. Electrochemical Soc., 124(11) (1977), pp. 1686-1689, describe the reaction of a rod of pressed silicon dioxide and carbon powder in a plasma. Coldwell and Roques also describe the use of a radio-frequency induced plasma. As will be discussed, infra, the high gas flows associated with an induced plasma pose a severe limitation on the reduction reaction to form silicon. Further, Coldwell and Roques describe the difficulties caused by the high gas flows needed for the induced plasma. The product silicon was a vapor which was recovered by quenching. Silicon was never more than 33% of the quenched product. This low silicon recovery was thought by Coldwell and Roques to be the best attainable because of the high reactivity of the species that were formed in the plasma at the given conditions. The method of Coldwell and Roques is a batch procedure as compared to the continuous process of the instant invention. Additionally, Coldwell and Roques were obviously working in a much higher temperature regime than the instant invention, given the fact that silicon left the reaction zone as a vapor. This higher temperature regime completely changes the chemical and thermal equilibria of the system and makes comparison to the instant invention meaningless.

Stramke et al. in German OLS No. 2,924,584, published on Jan. 15, 1981, describe the passing of silica or silicon through a plasma flame in a reducing atmosphere. The teaching of Stramke et al., is not directed to the carbothermic reduction of silicon dioxide, as is the instant invention, but rather to the reduction of impurities in silica or silicon so that these reduced impurities can be volatilized and removed from the silicon material. Reducing gases cited were hydrogen ($H_2$), methane, ethane, and ethylene, and other saturated and unsaturated lower hydrocarbons.

Dahlberg et al., in U.S. Pat. No. 4,377,564, issued on Mar. 22, 1983, describe preparation of silicon in a plasma using silicon dioxide and a reducing agent. Silicon is produced in a plasma as a vapor and is recovered from the vapor reaction mixture by deposition on a substrate or condensation. No mention is made of yields. However, it would appear that this teaching would have the same shortcomings as those of the method of Coldwell and Rogues, supra. Reducing agents cited were carbon, hydrogen, hydrocarbons, nitrogen, carbon monoxide (CO), halogens, and water vapor.

Santen and Edstrom in U.S. Pat. No. 4,439,410, issued Mar. 27, 1984, disclose a process for preparing silicon in which silica and an optional reducing agent are injected into a gas plasma. The heated feed and energy-rich plasma gas are introduced into a reaction chamber packed with a solid reducing agent. Silica is caused to melt and is reduced to silicon. Reaction gases comprise a mixture of $H_2$ and CO and can be recirculated and used as a carrier gas for the plasma. Santen and Edstrom disclose that the plasma can be generated by electrical arc or inductive means. Reducing agents cited were hydrocarbon (natural gas), coal dust, charcoal dust, carbon black, petroleum coke, and others.

In studying the Santen and Edstrom patent, several inconsistencies are noted. First, the description of the invention discloses that the plasma burner used is an inductive plasma burner. Secondly, the description of the invention is silent on the generation of a plasma by electric arc means which is, however, claimed. Santen and Edstrom claim that the plasma is also generated by allowing a plasma gas to pass an electric arc. Santen and Edstrom are silent as to whether or not the plasma is generated in a transferred arc or a non-transferred arc mode which indicates that they did not appreciate the significant differences which lead to the benefits derived from the instant invention. This distinction is very significant. The transferred arc mode uses a minimum of gas, while the non-transferred arc mode utilizes a gas volume that is approximately 5 to 10 times greater to transfer a like amount of energy. As an example of the difference in gas volume required, for a plasma generated with 1000 kilowatts (kW) of energy a transferred arc configuration would require 10 to 25 standard cubic feet per minute (scfm) of gas compared to 100 to 150 scfm or more required for a non-transferred arc configuration. In the transferred arc mode, two electrodes are spaced a distance apart, such as the top and the bottom of the reactor. The plasma gases can flow either from the cathode to the anode or vice versa. The volume of gas utilized in the transferred arc mode is that volume necessary to form the plasma itself. In the non-transferred arc mode, two electrodes are in the generator itself. The arc is struck in the generator, the plasma is formed, and the plasma is in effect blown into the reaction zone by a larger volume of gas. In a non-transferred arc configuration, it is estimated that 10% of the feed gas is converted to a plasma, while 90% of the feed gas is used to move the plasma into the reaction zone. A radio-frequency induced plasma utilizes the same relative volume of gas per level of input energy as does the non-transferred arc plasma. In regard to the use of an inductive plasma burner, other references in the art (as an example, National Institute for Metallurgy Report No. 1895, "A Review of Plasma Technology with Particular Reference to Ferro-Alloy Production," Apr. 14, 1977, pg. 3) note that the scale-up of radio-frequency induced plasmas is difficult and expensive and remains essentially a laboratory tool. The dilution by an extraneous gas can severely reduce the partial pressure of the silicon monoxide intermediate and inhibit the formation of silicon, as noted in the reference of Muller et al., supra. This phenomenon will be discussed and shown in the examples, infra.

As a further inconsistency, Santen and Edstrom teach the use of recycled $H_2$ and CO as the plasma gas. It was found in the development of the instant invention that addition of CO to the reaction zone severely inhibited the formation of silicon. The significance of this finding will be discussed in the examples, infra.

Several significant findings were discovered during the development of the instant invention. It was found that use of a plasma in a non-transferred arc configuration in which the plasma gases and a continuous feed of silicon dioxide and solid carbonaceous material was passed through the reaction bed of solids resulted in no silicon formation. The high flow of plasma gases would have a significant impact upon dilution of the reaction gases. This finding is consistent with the teachings, supra, which indicate that silicon will not form until a critical partial pressure of silicon monoxide is exceeded. To further illustrate this phenomenon, a modification to the plasma-reactor configuration in which the plasma gases did not penetrate the reaction bed and did not subsequently dilute the reaction gases resulted in the formation of silicon. This modification, discussed in the example, infra, would approximate the gas flow in the reaction zone for a transferred arc plasma configuration.

A further finding was the demonstration that addition of carbon monoxide to the reaction zone of a reactor which was producing silicon stopped the formation of silicon. This finding is illustrated in the example, infra.

BRIEF DESCRIPTION OF THE DRAWINGS

The instant invention will become better understood by those skilled in the art from a consideration of the attached drawings.

FIG. 1 is a schematic diagram of a silicon furnace configuration in which the flow of the plasma gas and the solid reactants is introduced at the top of the reactor.

FIG. 2 is a schematic diagram of a configurational variation of FIG. 1 in which the flow of the plasma gas and the solid reactants is introduced in the bottom half of the reactor.

DESCRIPTION OF THE DRAWINGS

Figure 1:
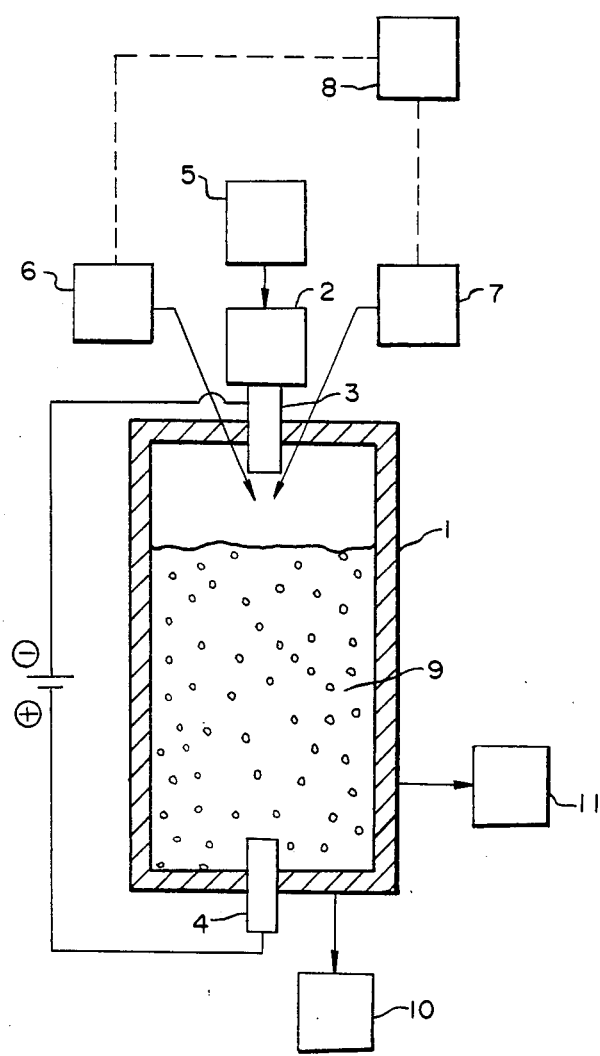
FIGS. 1 and 2 are schematic diagrams, partially in cross-section, to illustrate two preferred embodiments of the instant invention.

FIG. 1 is a representation of a reactor system utilizing a plasma to produce silicon. Starting with the reactor body 1, the reactor body can be a refractory-lined tank type vessel, or the like, known in the art of design of smelting equipment. The transferred arc plasma generator 2 is positioned so that the first electrode 3 is positioned at the top of the reactor body 1 and the second electrode 4 is spaced distant from 3 within the reactor body 1, it being understood that the exact position and polarity of the electrodes as shown is for illustratve purposes and not as a limitation; the transferred arc plasma generator can be designed similarly to those known in the art. The plasma generator is coupled to a means 5 of providing a reducing gas or an inert gas or a mixture thereof to the plasma generator; the means to provide the plasma gas can be any conventional means such as commercial compressed gas pipelines or trailers and appropriate connections; in the transferred arc plasma generator of this particular configuration the flow of the plasma gas moves from the top of the reactor downward. To direct the flow of solid reactants into the reactor body 1 and into the plasma, a means 6 of feeding a mixture of silicon dioxide and a solid reducing agent is mounted on the top of the reactor body 1. Also mounted on the top of the reactor body 1 is a means 7 of feeding silicon dioxide into the plasma; the mixture of silicon dioxide and a solid reducing agent fed by means 6 and the silicon dioxide fed by means 7 are fed into the reactor body 1 and into the plasma alternately; the means 6 and means 7 to feed either the mixture of silicon dioxide and a solid reducing agent or the silicon dioxide alone can be any conventional means such as gravity feed or gas pressure in combination with a gas-lock valve, screw feeders, pneumatic conveyors, and the like. To control the alternating feeds from 6 and 7 a means 8 of controlling the alternating feeds of the mixture of silicon dioxide and a solid reducing agent and the silicon dioxide feed is provided; the means of controlling the alternating feeds can be any conventional means such as manual control, automatic feed control, and the like. In the configuration of FIG. 1 the reactor body 1 is partially filled with a bed of solid reactants before a production run begins, the bed of reactants being designated as 9; the bed of solid reactants can be a solid reducing agent alone or a mixture of silicon dioxide and a solid reducing agent. The molten silicon product collects at the bottom of the reactor body 1 and is recovered by a means 10 of recovering molten silicon; this means 10 of recovering the molten silicon can be any of such known techniques as batch or continuous tapping. The byproduct gases exit the reactor body 1 at the bottom portion; a means 11 of recovering the by-product gases from the reactor is provided; this means 11 of recovering the by-product gases can be any conventional means such as burning for disposal or energy recovery.

Figure 2:
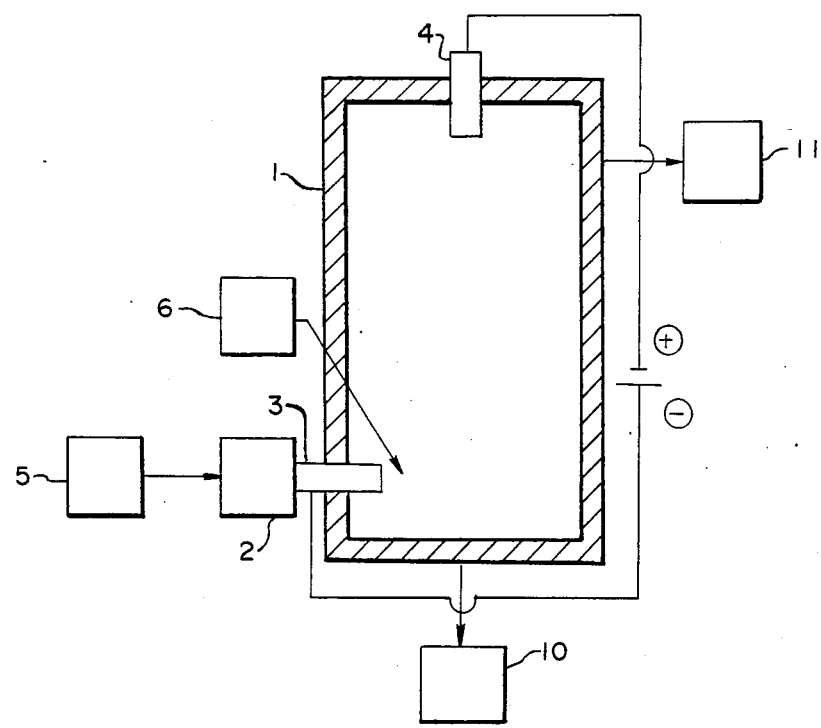

FIG. 2 is a variation of the reactor system shown in FIG. 1. The numerical designation of the elements of the reactor system are the same in both FIGS. 1 and 2. The basic difference in FIG. 2 is the fact that the flow of the plasma gases and the solid reactant feeds are introduced in the bottom half of the reactor body, it being understood that the exact position of the plasma generator 2 with its electrodes 3 and 4 as shown is for illustrative purposes and not as a limitation. In FIG. 2 the solid reactants fed into the reactor and into the plasma are a mixture of silicon dioxide and a solid reducing agent; the solid reactants are introduced into the bottom half of the reactor body 1 by a means 6 of feeding solids, it being understood that the exact position of the means 6 of feeding a mixture of silicon dioxide and a solid reducing agent as shown is for illustrative purposes and not as a limitation. In FIG. 2 the reactor body 1 is not filled with solid reactants before the start of a production run.

DESCRIPTION OF THE INVENTION

In accordance with the instant invention there is provided a process to produce silicon using a gas plasma as the energy source under conditions that will be delineated herein. What is described, therefore, is a process for producing silicon using a gas plasma as the energy source, said process comprising (I) generating a gas plasma in a reactor utilizing a transferred arc configuration in which a minimum of gas is utilized to form the plasma;

(II) feeding silicon dioxide and a solid reducing agent directly into the reactor and to the plasma;

(III) passing the plasma gas, the silicon dioxide, and the solid reducing agent into a reaction zone of the reactor;

(IV) recovering molten silicon and the gaseous by-products from the reaction zone.

A "transferred arc configuration" for a gas plasma means that the two electrodes of the plasma generator are spaced at a distance from one another. The flow of gas proceeds from the cathode to the anode, or vice versa. FIGS. 1 and 2 include two representations of the transferred arc plasma generator configuration. Because of the nature of this transferred arc plasma configuration, the volume of gas required to form the plasma is significantly lower (by a factor of as much as 10) as compared to a "non-transferred arc configuration" in which two electrodes are contained in the plasma generator and in which gas flow alone moves the plasma into the reaction zone. These differences are discussed in detail, supra. "A minimum amount of gas" means that only that amount of gas necessary to effectively form a plasma should be fed to the system. Holding the input of gas to a minimum reduces the difficulties created by dilution of the reaction medium, as discussed supra. The transferred arc plasma generator and the means to provide a plasma gas are known in the art of design of such means and are described in the description of the drawings.

"Solid reactants" as used in this invention means silicon dioxide and a solid reducing agent, both in their many kinds and forms. Feeding of the silicon dioxide and the solid reducing agent into the plasma can be effected by conventional means such as gravity feed or gas pressure in combination with a gas-lock valve, screw feeders, pneumatic conveyors, and the like. The silicon dioxide and solid reducing agent may be fed alternately, first as a mixture of silicon dioxide and the solid reducing agent, and then as silicon dioxide alone. The feeds can be alternately repeated, the alternate feed being effected by such known means as manual switching, automated control, and the like. The silicon dioxide and the solid reducing agent may also be fed as a combined mixture.

The reaction of silicon dioxide and carbon directly in the high-energy plasma facilitates the overall reaction,

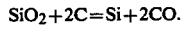
$SiO_2 + 2C = Si + 2CO$.

This overall reaction can be represented by the sequential reaction scheme outlined below, the individual reactions are disclosed supra,

$SiO_2 + 3C = SiC + 2CO$,   (1)

$2SiO_2 + SiC = 3SiO + CO$, and   (4)

$SiC + SiO = 2Si + CO$.   (5)

The reaction sequence is facilitated by forcing the formation of SiC via reaction (1). The presence of SiC will assure that $SiO_2$ is effectively consumed to form, according to reaction (4), SiO which subsequently reacts with SiC to form silicon and is not lost to the by-product gases. A key to forcing the formation of SiC, according to reaction (1), is maintaining the stoichiometric quantity of carbon to silicon dioxide in a molar excess favoring carbon—i.e., in excess of 3 moles of carbon per mole of silicon dioxide. In turn, the overall feeds should be controlled so that silicon dioxide and carbon are maintained at essentially the stoichiometric quantity of the overall reaction, that stoichiometric quantity being 2 moles of carbon per mole of silicon dioxide. "At essentially the stoichiometric quantity of the overall reaction" means that the proportion of carbon to silicon dioxide is at or up to 1 to 2 percent above the stoichiometric quantity. It is understood that in both the overall raction and reaction (1) less than stoichiometric quantity of carbon relative to silicon dioxide can be utilized, with the penalty that silicon dioxide raw material efficiency will be reduced by loss of unconsumed SiO. Thus, in the alternate feeding of first a mixture of silicon dioxide and a solid reducing agent and then silicon dioxide, in the mixture of silicon dioxide and the solid reducing agent the proportion of silicon dioxide and the solid reducing agent is controlled so that carbon is in a molar excess relative to silicon dioxide of up to 20 percent above the stoichiometric quantity, the stoichiometric quantity being 3 moles of carbon per mole of silicon dioxide. Then the silicon dioxide feed is controlled so that the combined proportion of carbon and silicon dioxide is at essentially the stoichiometric quantity of the overall reaction, the stoichiometric quantity being 2 moles of carbon per mole of silicon dioxide. This consideration also applies when the mixture of silicon dioxide and a solid reducing agent are the feed into the reactor and to the plasma.

The reactor may be partially filled with solid reactants, a solid reducing agent alone or a mixture of silicon dioxide and a solid reducing agent. The partial filling of the reactor is considered to allow adequate space to accommodate the formation of solids from the reaction of silicon dioxide and the solid reducing agent fed directly into the plasma. The solid reducing agent, which is used alone or in a mixture with silicon dioxide to partially fill the reactor, may be the same as or different than the solid reducing agent which is fed directly into the reactor and to the plasma. The silicon dioxide used to partially fill the reactor, likewise, can be the same as or different than the silicon dioxide fed directly into the reactor and to the plasma.

The use of a plasma results in the elimination of the carbon electrodes used in a conventional electric arc furnace. The carbon electrodes are the major source of impurities in the smelting process. Therefore, the elimination of the carbon electrode will result in a final silicon material that will have a purity of at least 98 weight percent, and possibly 99 weight percent or better.

The reactor system can be configured so that the flow of the plasma, the silicon dioxide, and the solid reducing agent is co-current in a downward direction with the molten silicon and the gaseous by-products discharging in the bottom half of the reactor. An example of this configuration is shown FIG. 1. The reactor system can alternatively be configured so that the flow of the plasma, the silicon dioxide, and the solid reducing agent can be introduced into the bottom half of the reactor with the molten silicon discharging in the bottom of the reactor. FIG. 2 is an example of this configuration.

The reactor system is designed so that pressures in the range of atmospheric pressure to 6 atmospheres can be maintained. The higher pressures can be used to maximize energy utilization and raw material efficiency. Operation of a closed reactor system at atmospheric pressure or above better facilitates the recovery and reuse of the by-product gases.

The plasma gas may be a reducing gas selected from a group which comprises hydrogen, saturated hydrocarbons, and unsaturated hydrocarbons. The plasma gas may also be an inert gas selected from a group which comprises argon and nitrogen. The gas used to form a plasma may also be a mixture of a reducing gas and an inert gas.

The silicon dioxide which is fed to the plasma or which may, as a mixture with the solid reducing agent, be used to partially fill the reactor is selected from a group which comprises quartz in its many naturally occurring forms and fused and fume silica in their many forms. The form of the silicon dioxide is selected from a group which comprises powders, granules, lumps, pebbles, pellets, and briquettes.

The solid reducing agent which is fed to the plasma and the solid reducing agent with which the reactor is filled is selected from a group which comprises carbon black, charcoal, coke, coal, wood chips. The form of the solid reducing agent is selected from a group which comprises powders, granules, chips, lumps, pellets, and briquettes.

The mixture of silicon dioxide and a solid reducing agent which is fed to the plasma or which may be used to partially fill the reactor may be in a form which is selected from a group which comprises powders, granules, lumps, pellets, and briquettes.

"Recovery of molten silicon" means any conventional means of removal of the molten silicon product from the reaction zone by such known techniques as batch or continuous tapping. The "by-product gases" from the reaction to form silicon are composed primarily of by-produced carbon monoxide. Also included in this gas stream are the plasma gases and lesser quantities of gases such as water vapor, carbon dioxide, and the like. "Recovery of the by-product gases" means the handling of the gases by known means of disposal or recovery of energy. Examples of recovery of energy are the use of the hot gases to preheat the plasma gas or reactants, burning of the combustible gases to generate heat for steam, burning in a gas turbine coupled to an electrical generator, or the like.

PREFERRED EMBODIMENT OF THE INVENTION

The preferred mode of carrying out the instant invention is to configure the system so that one of the electrodes of the transferred arc plasma generator, the plasma gas source, and the feeds of silicon dioxide and the solid reducing agent are at the top of the reactor filled with a mixture of silicon dioxide and a solid reducing agent. This configuration results in a co-current flow of the plasma gas, the reactants, final molten silicon, and gaseous by-products.

The preferred method of feeding the silicon dioxide and a solid reducing agent into the reactor and to the plasma is as alternating feeds, first a mixture of silicon dioxide and a solid reducing agent and then silicon dioxide, the feeds being alternately repeated. For the mixture of silicon dioxide and the solid reducing agent, the proportion of silicon dioxide and the solid reducing agent is controlled so that that carbon is in a molar excess relative to silicon dioxide in the range of 1 to 10 percent above the stoichiometric quantity. Alternately the silicon dioxide feed is controlled so that molar proportion of carbon to silicon dioxide is at essentially the stoichiometric quantity of the overall reaction.

The preferred plasma gas is methane or a mixture of argon and hydrogen.

Purity of the raw materials used is such that the product silicon has a purity of at least 99%. The silicon dioxide feed is quartz or silica in the form of a powder or granules. The reducing agent to be fed with the silicon dioxide feed is carbon black, coal, charcoal, or coke in the form of a powder or granules. The solid reactants with which the reactor is filled is a mixture of quartz or silica and charcoal, coal, coke, or wood. The mixture of solid reactant is in the form of lumps, chips, or briquettes.

The pressure in the reactor should be maintained in the range of 5 to 6 atmospheres to maximize energy and raw material utilization.

The reactor system to produce silicon is that system represented by FIG. 1.

The following examples are presented to be illustrative of the instant invention and are not to be construed as limiting the instant invention delineated in the claims.

EXAMPLE 1

(Not within the scope of the instant invention)

A pilot submerged arc furnace was modified to study the effect of adding gases in a simulated plasma configuration to the carbothermic reduction of silicon dioxide. Carbon monoxide was the gas evaluated.

The silicon smelting experiments were completed in a 200 kVA arc reactor. The electrode was hollow to allow passage of a gas to simulate a plasma. The carbothermic reaction of $SiO_2$ and a carbonaceous reducing agent was begun. After baseline conditions were attained, the subject gas was allowed to flow through the hollow electrode.

The batch charge of one mole of $SiO_2$ and two moles of carbon (6 kg of $SiO_2$ as a basis for a charge) was fed to the reactor. This baseline mixture consisted of $SiO_2$ as quartz and a carbonaceous mixture of lump coal, petroleum coke, and wood chips.

The arc reactor was allowed to stabilize by operating for a period of 24 hours. Stable conditions and generation of silicon were noted. CO was injected through the hollow electrode at a rate of 5 scfm. The gas injection resulted in erratic furnace operation with excess fuming (assumed to be excess SiO) and complete stoppage of silicon production.

These results would appear to demonstrate the detrimental effects of non-reactant or diluent gas upon the formation of silicon and the theory that the partial pressure of the SiO intermediate must be a minimum for the formation of silicon.

EXAMPLE 2

(Not within the scope of the instant invention)

A potential smelting reactor using a plasma as the energy source was assembled and evaluated. In the configuration evaluated, the plasma source was mounted on top of the reactor.

The plasma torch was a Westinghouse Marc 11D torch rated at 1.5 megawatt maximum power. Heating of the process gas was entirely in the torch (non-transferred gas arc plasma). A feed hopper was mounted above the reactor to feed materials continuously.

Argon was used as a continuous purge during operation and to purge oxygen and other gases from the system before the start of a run. The gas used for operation of the torch was an 8/1 mixture (on a volume basis) of hydrogen to argon. The reactor had a vent at its bottom portion. The vent passed through pressure control to a water scrubber.

Solids in the form of lump coal and briquettes of mixtures of silicon dioxide materials and solid carbonaceous material were charged to the reactor before the run. Small briquettes of carbonaceous material and ground quartz were fed into the plasma during the run. At the end of the run, the combined weights of the solids in the reactor and the solids fed were determined. This inventory of solids showed that a total of approximately 34% by weight of solids had been lost during the course of the reaction.

The plasma was directed to the top of the reactor charge, gases flowed through the bed and vented out the bottom of the reactor. Feeds of carbonaceous material and quartz passed into the tail of the plasma. No silicon was found in the bed. The top portion of bed appeared to be porous SiC. Significant material loss indicates that a chemical reaction did occur. The appearance of SiC and the above noted weight loss of the solids indicates that the reactions:

$$SiO_2 + C = SiO + CO$$

and $$SiO + 2C = SiC + CO$$

had occurred. The absence of silicon indicates that the reaction:

$$SiO + SiC = 2Si + CO$$

did not occur.

The results of the above run demonstrate that silicon was not formed in a reactor scheme in which the plasma generator was in a non-transferred arc configuration in which a large volume of inert gas or non-reactive gas was fed.

EXAMPLE 3

The plasma/reactor system of Example 2 was modified to minimize the volume of diluent gases in the reaction zone, an attempt to simulate the gas flow of a transferred arc plasma.

A manifold of graphite tubes was placed inside the reactor at the periphery of the reactor wall. In this configuration, the plasma gases penetrated the upper portion of the reactor charge, but due to gas flow resistance in the bed were forced back toward the top of the reactor and then down through the graphite tubes. The gases transferred their heat content to the top of the charge by direct contact and then through the walls of the tubes by conduction and convection. In this manner, the plasma gas did not dilute the reaction gases within the reaction zone. The plasma gases and reaction gases where subsequently combined at the bottom of the reactor for venting.

As in Example 2, the reactor was initially charged with solid reactants. Solids, again, were subsequently fed into the plasma during the course of the run. The solids charged to the reactor before the run were lump coal, crushed quartz, and charcoal. Solids fed into the plasma during the run were $SiO_2$ pebbles and carbon.

After the run, the contents of the reactor and the solid feeds were inventoried. This inventory indicated a net weight loss of solids of approximately 32%.

Vessel pressure rose to above 2 atmospheres. Plasma gases and reaction gases were combined at bottom of reactor and vented to the scrubber. Graphite tubes and exhaust tube plugged with carbon and charcoal dust. Deposits of silicon were found near or adjacent to the graphite tubes. A sample of the deposited silicon was analyzed by elemental analysis and found to be greater than 99.6 weight percent silicon.

The deposits of silicon indicate that silicon did form in the reaction zone at an elevated temperature. This result lends support to the fact that the absence of extraneous gases allowed formation of silicon by allowing the partial pressure of SiO to attain a minimum level for formation of silicon to occur. Additionally, pressure during the reaction aided in the formation of silicon. The minimizing of the presence of diluent gases in the reaction zone by the configurational changes, approximated the gas flow of a transferred arc plasma generator.

The result of the above run indicated that the reaction:

$$SiO + SiC = 2Si + CO$$

did occur and was facilitated by the simulated gas flow of a transferred arc configuration and the use of pressure during the reaction.

What we claim is:

1. A process for producing silicon using a gas plasma as the energy source, said process comprising
   (I) generating a gas plasma in a reactor utilizing a transferred arc configuration in which a minimum of gas is utilized to form the plasma;
   (II) feeding silicon dioxide and a solid reducing agent directly into the reactor and to the plasma;
   (III) passing the plasma gas, the silicon dioxide, and the solid reducing agent into a reaction zone of the reactor;
   (IV) recovering molten silicon and the gaseous by-products from the reaction zone.

2. A process according to claim 1, wherein the silicon dioxide and the solid reducing agent are fed, alternately, first as a mixture of silicon dioxide and the solid reducing agent and then silicon dioxide, the feeds being repeated alternately.

3. A process according to claim 2, wherein in the mixture of silicon dioxide and the solid reducing agent, the proportion of silicon dioxide and the solid reducing agent is controlled so that carbon is in a molar excess relative to silicon dioxide of up to 20 percent above the stoichiometric quantity.

4. A process according to claim 2, wherein in the mixture of silicon dioxide and the solid reducing agent, the proportion of silicon dioxide and the solid reducing agent is controlled so that carbon is in a molar excess relative to silicon dioxide in the range of 1 to 10 percent above the stoichiometric quantity.

5. A process according to claim 2, wherein the silicon dioxide feed is controlled so that the combined proportion of carbon and silicon dioxide is at essentially the stoichiometric quantity of the overall reaction.

6. A process according to claim 1, wherein the silicon dioxide and the solid reducing agent are fed as a combined mixture.

7. A process according to claim 6, wherein in the mixture of silicon dioxide and the solid reducing agent, the proportion of silicon dioxide and the solid reducing agent is controlled so that the combined proportion of carbon and silicon dioxide is at essentially the stoichiometric quantity of the overall reaction.

8. A process according to claim 1, wherein the reaction zone is partially filled with one or more solid reactants.

9. A process according to claim 8, wherein the solid reactant which partially fill the reaction zone is a solid reducing agent.

10. A process according to claim 8, wherein the solid reactants which partially fill the reaction zone are a mixture of silicon dioxide and a solid reducing agent.

11. A process according to claim 9, wherein the solid reducing agent which partially fills the reaction zone is the same as the solid reducing agent which is fed into the reactor and to the plasma.

12. A process according to claim 9, wherein the solid reducing agent which partially fills the reaction zone is different than the solid reducing agent which is fed into the reactor and to the plasma.

13. A process according to claim 10, wherein the solid reducing agent which is used in the mixture to partially fill the reaction zone is the same as the solid reducing agent which is fed into the reactor and to the plasma.

14. A process according to claim 10, wherein the solid reducing agent which is used in the mixture to partially fill the reaction zone is different than the solid reducing agent which is fed into the reactor and to the plasma.

15. A process according to claim 10, wherein the silicon dioxide which is used in the mixture to partially fill the reaction zone is the same as the silicon dioxide which is fed into the reactor and to the plasma.

16. A process according to claim 10, wherein the silicon dioxide which is used in the mixture to partially fill the reaction zone is different than the silicon dioxide which is fed into the reactor and to the plasma.

17. A process according to claim 1, wherein the silicon produced has a purity of at least 98 weight percent.

18. A process according to claim 1, wherein the flow of the plasma, the silicon dioxide, and the solid reducing agent is co-current in a downward direction, with the molten silicon and the gaseous by-products discharging at the bottom half of the reactor.

19. A process according to claim 1, wherein the flow of the plasma, the silicon dioxide, and the solid reducing agent is introduced to the bottom half of the reactor with the molten silicon discharging in the bottom of the reactor.

20. A process according to claim 1, wherein the reactor is maintained at a pressure in the range of atmospheric pressure to 6 atmospheres.

21. A process according to claim 1, wherein the gas used to form a plasma is a reducing gas selected from a group which comprises hydrogen, saturated hydrocarbons, and unsaturated hydrocarbons.

22. A process according to claim 1, wherein the gas used to form a plasma is an inert gas selected from a group which comprises argon and nitrogen.

23. A process according to claim 1, wherein the gas used to form a plasma is a mixture of a reducing gas and an inert gas.

24. A process according to claim 21, wherein the reducing gas is methane.

25. A process according to claim 22, wherein the inert gas is argon.

26. A process according to claim 23, wherein the mixture of a reducing gas and an inert gas is a mixture of hydrogen and argon.

27. A process according to claim 1, wherein the silicon dioxide feed is selected from a group which comprises quartz, fused silica, and fumed silica.

28. A process according to claim 1, wherein the solid reducing agent feed to the reactor is selected from a group which comprises carbon black, charcoal, coke, coal, and wood chips.

29. A process according to claim 2, wherein the silicon dioxide feed is in a form selected from a group which comprises powders, granules, lumps, pebbles, pellets, and briquettes.

30. A process according to claim 2, wherein the mixture of silicon dioxide and solid reducing agent which is fed into the reactor and to the plasma is in a form selected from a group which comprises powders, granules, lumps, pellets, and briquettes.

31. A process according to claim 6, wherein the mixture of silicon dioxide and solid reducing agent which is fed into the reactor and to the plasma is in a form selected from a group which comprises powders, granules, lumps, pellets, and briquettes.

32. A process according to claim 9, wherein the solid reducing agent which is used to partially fill the reactor is selected from a group which comprises carbon black, charcoal, coke, coal, and wood.

33. A process according to claim 10, wherein the solid reducing agent which is used in the mixture that partially fills the reactor is selected from a group which comprises carbon black, charcoal, coke, coal, and wood.

34. A process according to claim 10, wherein the silicon dioxide which is used in the mixture that partially fills the reactor is selected from a group which comprises quartz, fused silica, and fume silica.

35. A process according to claim 9, wherein the solid reducing agent is in the form selected from a group which comprises powders, chips, granules, lumps, pellets, and briquettes.

36. A process according to claim 10, wherein the mixture of silicon dioxide and the solid reducing agent is in the form selected from a group which comprises powders, granules, lumps, pellets, and briquettes.

* * * * *